(12) United States Patent
Denolf et al.

(10) Patent No.: US 11,676,004 B2
(45) Date of Patent: Jun. 13, 2023

(54) ARCHITECTURE OPTIMIZED TRAINING OF NEURAL NETWORKS

(71) Applicant: Xilinx, Inc., San Jose, CA (US)

(72) Inventors: Kristof Denolf, Los Gatos, CA (US); Kornelis A. Vissers, Sunnyvale, CA (US)

(73) Assignee: XILINX, INC., San Jose, CA (US)

( * ) Notice: Subject to any disclaimer, the term of this patent is extended or adjusted under 35 U.S.C. 154(b) by 1409 days.

(21) Appl. No.: 15/677,311

(22) Filed: Aug. 15, 2017

(65) Prior Publication Data

US 2019/0057305 A1 Feb. 21, 2019

(51) Int. Cl.
*G06N 3/08* (2023.01)
*G06N 3/084* (2023.01)
*G06N 3/063* (2023.01)
*G06N 3/04* (2023.01)

(52) U.S. Cl.
CPC ............ *G06N 3/08* (2013.01); *G06N 3/04* (2013.01); *G06N 3/063* (2013.01); *G06N 3/084* (2013.01)

(58) Field of Classification Search
CPC ...... G06N 3/0454; G06N 3/063; G06N 3/084; G06N 3/0445; G06N 3/08; G06N 3/04
See application file for complete search history.

(56) References Cited

U.S. PATENT DOCUMENTS

2016/0328644 A1 11/2016 Lin et al.
2017/0091657 A1* 3/2017 Kida ...................... G06N 20/00

FOREIGN PATENT DOCUMENTS

WO WO-2015053864 A1 * 4/2015 ............. G06N 3/049
WO 2016118257 A1 7/2016

OTHER PUBLICATIONS

Suda et al., "Throughput-Optimized OpenCL-based FPGA Accelerator for Large-Scale Convolutional Neural Networks," FPGA'16, Feb. 21-23, 2016, Monterey, CA, USA (Year: 2016).*
Zhao et al., Optimizing CNN-Based Object Detection Algorithms on Embedded FPGA Platforms, Springer International Publishing AG 2017, pp. 255-267 (Year: 2017).*
Wang et al., DeepBurning: Automatic Generation of FPGA-based Learning Accelerators for the Neural Network Family, DAC '16, Jun. 5-9, 2016, Total pp. 6 (Year: 2016).*
Hedge, G., et al., "CafePresso: An Optimized Library for Deep Learning on Embedded Accelerator-based platforms", 2016 International Conference on Compilers, Architectures, and Systhesis of Embedded Systems (CASES), ACM, Oct. 2, 2016, pp. 1-10.
Ji Yu et al: "NEUTRAMS: Neural network transformation and co-design under neuromorphic hardware constraints", 2016 49th Annual IEEE/ACM International Symposium on Microarchitecture (Micro), IEEE, 15 Oct. 15, 2016, pp. 1-13.

(Continued)

*Primary Examiner* — Alan Chen
(74) *Attorney, Agent, or Firm* — Patterson + Sheridan, LLP (57) ABSTRACT

An example a method of optimizing a neural network having a plurality of layers includes: obtaining an architecture constraint for circuitry of an inference platform that implements the neural network; training the neural network on a training platform to generate network parameters and feature maps for the plurality of layers; and constraining the network parameters, the feature maps, or both based on the architecture constraint.

17 Claims, 7 Drawing Sheets

(56) References Cited

OTHER PUBLICATIONS

Alemdar, Hande, et al., "Ternary Neural Networks for Resource-Efficient AI Applications", 2017 International Joint Conference on Neural Networks (IJCNN), IEEE, May 14, 2017, pp. 2547-2554.
Umuroglu, Yaman, et al., "FINN: A Framework for Fast, Scalable Binarized Neural Network Inference", Dec. 1, 2016, pp. 1-9, arxiv.0rg, Cornell University Library, Ithaca, NY.
Sung, Wonyong, et al., "Resiliency of Deep Neural Networks Under Quantization", Jan. 7, 2016, pp. 1-11.
Han, Song, et al., "Deep Compression: Compressing Deep Neural Networks with Pruning, Trained Quantization and Huffman Coding", NIPS Deep Learning Symposium, Dec. 2015 and International Conference on Learning Representations (ICLR); Dec. 2015, pp. 1-14.
Merolla, Paul, et al. "Deep Neural Networks are Robust to Weight Binarization and other Non-linear Distortions", Jun. 7, 2016, pp. 1-10, IBM Research.
Sung, Wonyong, et al., "Resiliency of Deep Neural Networks under Quantization", Department of Electrical and Computer Engineering, Seoul National University, 2016 (12 pages).
Hegde Gopalalrishna et al: "CaffePresso: An optimized library for Deep Learning on embedded accelerator-based platforms", 2016 International Conference on Compliers, Architectures, and Sythesis of Embedded Systems (CASES), ACM, Oct. 2, 2016 (10 pages).
Ji Yu et al: "NEUTRAMS: Neural network transformation and co-design under neuromorphic hardware constraints", 2016 49th Annual IEEE/ACM International Symposium on Microarchitecture (MICRO), IEEE, Oct. 15, 2016 (14 pages).
Alemdar Hande et al: "Ternary neural networks for resource-efficient AI applications", 2017 International Joint Conference on Neural Networks (IJCNN), IEEE, May 14, 2017 (6 pages).
Yaman Umuroglu et al: "FINN: A Framework for Fast, Scalable Binarized Neural Network Inference", arxiv.0rg, Cornell University Library, 201 Olin Library Cornell University Ithaca, NY 14853, Dec. 1, 2016 (10 pages).
Yu, Jiecao, et al., "Scalpel: Customizing DNN Pruning to the Underlying Hardware Parallelism", 2017 ACM/IEEE 44th Annual international Symposium on Computer Architecture (ISCA), IEEE, Jun. 24, 2017.

* cited by examiner

ARCHITECTURE OPTIMIZED TRAINING OF NEURAL NETWORKS

TECHNICAL FIELD

Examples of the present disclosure generally relate to neural networks and, in particular, to architecture optimized training of neural networks.

BACKGROUND

Machine learning is the science of inducing computing systems to act without being explicitly programmed. Classical machine learning includes various clustering and classification techniques, including K-means clustering, linear and logistic regressions, stochastic gradient decent, association rule learning, and the like. Deep learning is a newer frontier in machine learning. Deep learning is a class of machine learning algorithms that uses multiple layers of nonlinear processing units for feature extraction and transformation. Deep learning algorithms can be unsupervised (e.g., pattern analysis) or supervised (e.g., classification). The deep learning algorithm can be implemented using layers of an artificial neural network (ANN) (referred to herein as a "neural network").

In general, a neural network is a collection of nodes (i.e., the "neurons") that are connected in a graph. A node in a neural network computes a sum of weighted inputs and adds an optional bias to the sum. The output of the node is a function of the final sum (referred to as an "activation function"). Example activation functions include the sigmoid function, the hyperbolic tangent (tan h) function, the Rectified Linear Unit (ReLU) function, and the identity function. Neural network models are often organized into layers of nodes, which define a specific topology, and corresponding weights and biases. The weights and biases are referred to as network parameters.

In general, a neural network includes an input layer and an output layer and can optionally include one or more hidden layers between the input and output layers. A neural network used in deep learning applications typically includes many hidden layers, which gives rise to the term deep neural network (DNN). The layers of a neural network can be densely connected (e.g., each node in a layer is fully connected to all nodes in a previous layer) or sparsely connected (e.g., each node in a layer is connected to only a portion of the nodes in a previous layer). A convolutional neural network (CNN) is a type of DNN that includes one or more sparsely connected layers, referred to as convolutional layers. A CNN is well-suited for processing image or video data. Other types of DNNs include recurrent neural network (RNNs), which are well-suited for processing speech and text data.

Neural networks of any topology or type need the correct values of the network parameters across all layers in order to adapt the network to a specific task. A supervised training procedure can be used to determine a set of network parameters that yields desired accuracy for the specified task. Training involves running a training data set through a forward path of the network (forward propagation) and updating the weights through a backward path of the network (backward propagation) to compensate for prediction errors. The trained neural network is then deployed to perform the specified task on input data sets (referred to as inference). The computing platform used to train a neural network (training platform) is often more highly performant than the computing platform used for inference (inference platform). The inference platform, however, is often more power efficient than the training platform. It is desirable to reduce the computational intensity of inference for a neural network, particularly when using less performant inference platforms.

SUMMARY

Techniques for architecture optimized training of neural networks are described. In an example, a method of optimizing a neural network having a plurality of layers includes: obtaining an architecture constraint for circuitry of an inference platform that implements the neural network; training the neural network on a training platform to generate network parameters and feature maps for the plurality of layers; and constraining the network parameters, the feature maps, or both, based on the architecture constraint.

In another example, a computing system includes: a training platform for a neural network, the training platform including a hardware portion and a software portion, the hardware portion including at least one processor and a memory, the software portion including program code, stored in the memory, executable by the at least one processor to perform functions of: obtaining an architecture constraint for circuitry of an inference platform that implements the neural network; training the neural network on the training platform to generate network parameters and feature maps for the plurality of layers; and constraining the network parameters, the feature maps, or both, based on the architecture constraint.

In another example, a non-transitory computer readable medium having instructions stored thereon that when executed by a processor cause the processor to perform a method of optimizing a neural network having a plurality of layers, the method comprising: obtaining an architecture constraint for circuitry of an inference platform that implements the neural network; training the neural network on a training platform to generate network parameters and feature maps for the plurality of layers; and constraining the network parameters, the feature maps, or both, based on the architecture constraint.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for architecture optimized training of neural networks are described. In an example, a neural network having a plurality of layers is optimized by obtaining an architecture constraint for circuitry of an inference platform that implements the neural network. The inference platform can be a programmable integrated circuit (IC), such as a field programmable gate array (FPGA). Circuitry in a programmable IC, such as an FPGA, includes programmable logic (e.g., configurable logic blocks) and dedicated blocks, such as digital signal processor (DSP) blocks. The architecture constraint specifies some feature, element, limitation, or the like of the inference platform circuitry. The neural network is trained on a training platform to generate network parameters (e.g., weights and biases) and feature maps (e.g., activations) for the plurality of layers. The network parameters, feature maps, or both are constrained based on the architecture constraint. The techniques described herein exploit specific architecture aspects of the inference platform by enforcing constraints on the network parameters and/or feature maps in neural networks during the training phase to assure the optimal (e.g., most efficient) usage of the inference platform during the inference stage. For example, properly constraining the weights of a neural network during training enables the usage of a pre-adder in a DSP block of an FPGA, thereby fully exploiting the compute capacity of the FPGA when used as the inference platform. These and further aspects of optimizing network parameters and/or feature maps based on architecture constraints of the inference platform are described below with respect to the drawings.

Figure 1:
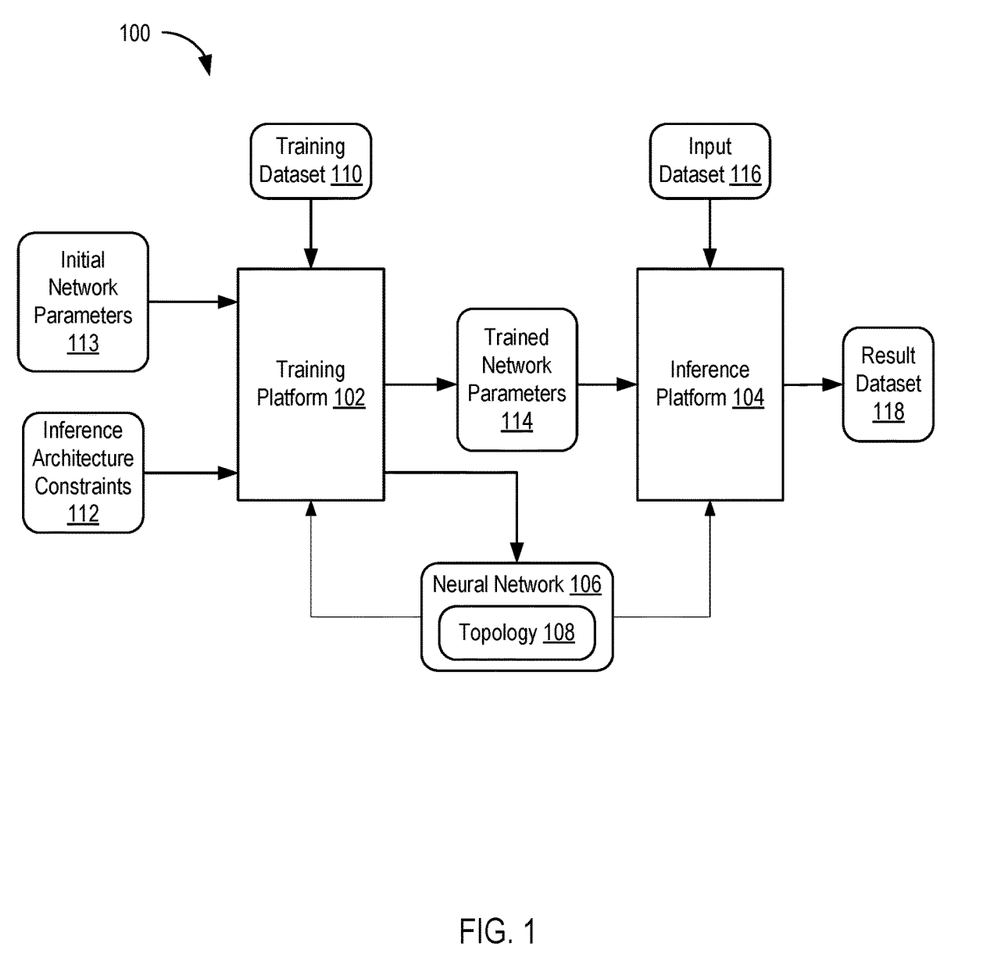
FIG. 1 is a block diagram depicting a system for training and implementing a neural network according to an example.

FIG. 1 is a block diagram depicting a system 100 for training and implementing a neural network according to an example. The system 100 includes a training platform 102 and an inference platform 104. The training platform 102 comprises hardware and software configured to train a neural network 106 for a specified task (e.g., image classification, object detection, etc.). The inference platform 104 includes hardware and/or software configured to implement the neural network 106 to perform the specified task. Examples of the training platform 102 and the inference platform 104 are described below.

In operation, a user specifies the neural network 106 having a particular topology 108. The topology 108 generally includes an arrangement of neurons. For example, the topology 108 can include a plurality of layers of neurons. The layers generally include an input layer, an output layer, and zero or more hidden layers. Each neuron includes a plurality of inputs and an output. The plurality of inputs for each neuron are associated with a plurality of weights. Each neuron further includes a bias associated with its output. The weights and biases of the neural network 106 are referred to as network parameters. For a given layer, the inputs of its neurons are referred to as input feature maps and the outputs of its neurons are referred to as output feature maps. Input feature maps and output feature maps are generally referred to as "feature maps."

The training platform 102 receives a training dataset 110 and initial network parameters 113. The training dataset 110 includes data for training the neural network 106 to generate trained network parameters 114. For example, if the neural network 106 is configured to classify images, the training dataset 110 can be a set of pre-classified images. The initial network parameters 113 include initial values for the network parameters of the neural network 106. In an example, the training platform 102 also includes an input to receive inference architecture constraints 112 (collectively referred to as an "architecture constraint," which includes one or more constraints). The inference architecture constraints 112 include one or more constraints associated with the hardware (e.g., circuitry) of the inference platform 104. Example inference architecture constraints are described further below. In general, the inference architecture constraints 112 specify some feature, element, limitation, or the like of the hardware of the inference platform 104. The inference architecture constraints 112 are used to constrain the network parameters and/or feature maps during the training process. In an example, the inference architecture constraints 112 can be used to constrain the network parameters and/or feature maps during the training process. In another example, the inference architecture constraints can be used to constrain the network parameters and/or feature maps after the training process. In either example, the trained network parameters 114 are constrained by the inference architecture constraints 112. Likewise, the topology 108 can be implemented with constrained feature maps (e.g., constrained activations input to one or more layers in the topology 108).

The inference platform 104 receives the trained network parameters 114 and an input dataset 116. The input dataset 116 includes the data to be processed by the neural network 106. For example, if the neural network is configured to classify images, the input dataset 116 can include images to be classified. The inference platform 104 generates a result dataset 118. For example, in an image classification scheme, the result dataset 118 includes classifications for images in the input dataset 116. Since the trained network parameters 114 have been constrained based on architecture constraints of the inference platform 104, the neural network 106 can be implemented efficiently by the inference platform, taking advantage of its features, elements, and limitations that were captured by the inference architecture constraints 112.

Figure 2:
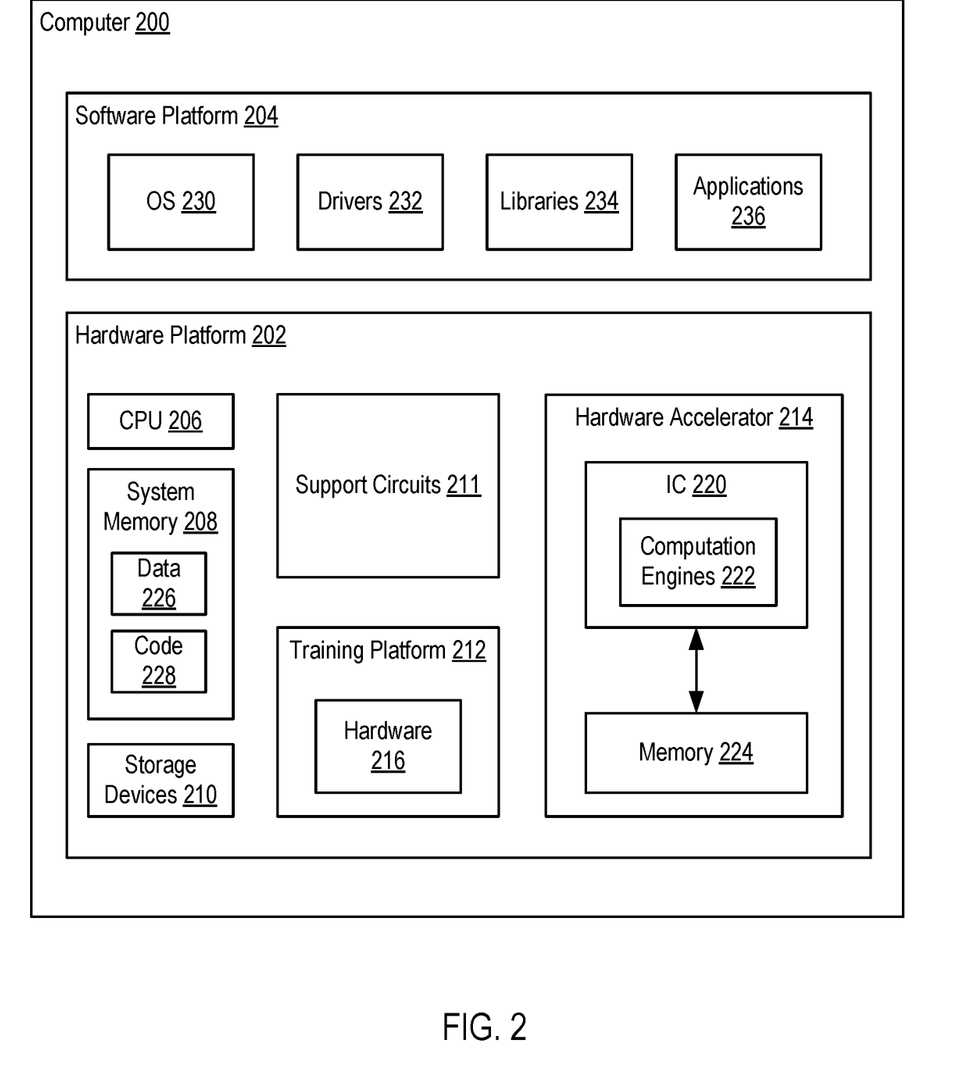
FIG. 2 is a block diagram depicting a computing system according to an example.

FIG. 2 is a block diagram depicting a computing system ("computer 200") according to an example. The computer 200 includes a software platform 204 executing on a hardware platform 202. The hardware platform 202 includes a central processing unit (CPU) 206, a system memory 208, storage devices 210, support circuits 211, a training platform 212, and a hardware accelerator 214. The software platform 204 includes an operating system (OS) 230, drivers 232, libraries 234, and applications 236.

The CPU 206 can be any type of general-purpose central processing unit (CPU), such as an x86-based processor, ARM®-based processor, or the like. The CPU 206 can include one or more cores and associated circuitry (e.g., cache memories, memory management units (MMUs), interrupt controllers, etc.). The CPU 206 is configured to execute program code that perform one or more operations described herein and which can be stored in the system memory 208 and/or the storage devices 210. The support circuits 211 include various devices that cooperate with the CPU 206 to manage data flow between the CPU 206, the system memory 208, the storage devices 210, the training platform 212, the hardware accelerator 214, or any other peripheral device. For example, the support circuits 211 can include a chipset (e.g., a north bridge, south bridge, platform host controller, etc.), voltage regulators, firmware (e.g., a BIOS), and the like. In some examples, the CPU 206 can be a System-in-Package (SiP), System-on-Chip (SoC), or the like, which absorbs all or a substantial portion of the functionality of the chipset (e.g., north bridge, south bridge, etc.).

The system memory 208 is a device allowing information, such as executable instructions and data, to be stored and retrieved. The system memory 208 can include, for example, one or more random access memory (RAM) modules, such as double-data rate (DDR) dynamic RAM (DRAM). The system memory 208 can store data 226 and program code ("code 228") processed and executed by the CPU 206 to implement the software platform 204. The storage devices 210 includes local storage devices (e.g., one or more hard disks, flash memory modules, solid state disks, and optical disks) and/or a storage interface that enables the computer 200 to communicate with one or more network data storage systems. The hardware platform 202 can include various other conventional devices and peripherals of a computing system, such as graphics cards, universal serial bus (USB) interfaces, and the like.

The training platform 212 includes hardware 216, which can include processor(s), memory, input/output (IO) circuits, and the like. In an example, hardware 216 includes a graphics processing unit (GPU) and associated support circuitry. In another example, hardware 216 can include an application specific integrated circuit (ASIC), programmable IC, or the like along with associated support circuitry. In an example, training platform 212 is more performant than the hardware accelerator 214, but also consumes more energy than the hardware accelerator 214. The training platform 212 can be used to train neural networks.

The hardware accelerator 122 includes an IC 220 and memory 224. The IC 220 includes computation engines 222. In an example, the IC 220 is a programmable IC, such as a field programmable gate array (FGPA) or a system-on-chip (SoC) having an FPGA therein. The computation engines 222 can be programmed in the IC 220. In another example, the IC 220 is an ASIC or the like, where the computation engines 222 are dedicated circuitry therein. The hardware accelerator 214 can be used in an inference platform for neural networks.

The OS 230 can be any commodity operating system known in the art, such as such as Linux®, Microsoft Windows®, Mac OS®, or the like. The drivers 232 and libraries 234 comprise software that provide application programming interfaces (APIs) to the training platform 212 and the hardware accelerator 214 for command and control thereof. The applications 236 include software that trains neural networks on the training platform 212 and implements neural networks on the hardware accelerator 214. The applications 236 communicate with the training platform 212 and the hardware accelerator 214 through the drivers 232 and libraries 234.

Figure 3:
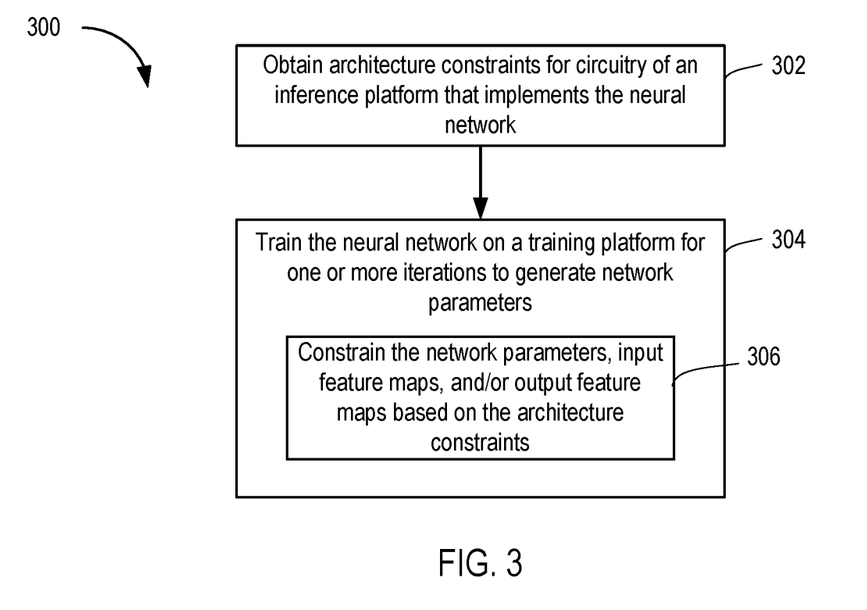
FIG. 3 is a flow diagram depicting a method of optimizing a neural network having a plurality of layers.

FIG. 3 is a flow diagram depicting a method 300 of optimizing a neural network having a plurality of layers. The method 300 can be performed by an application 236 executing on the computer 200 described above. The method begins at step 302, where the application 236 obtains architecture constraints for circuitry of the inference platform that implements the neural network. For example, the application 236 can obtain architecture constraints of the computation engines 222 in the IC 220 in the hardware accelerator 214.

At step 304, the application 236 trains the neural network on a training platform for one or more iterations to generate network parameters. For example, the application 236 can train the neural network on the training platform 212 using the hardware 216. Various training algorithms can be used, such as backpropagation combined with a learning algorithm, such as stochastic gradient decent. In such a training algorithm, the application 236 inputs a set of training data. For each training data (e.g., input image), the application 236 feeds the training data forward through the neural network to generate an output result. The application 236 computes the output error, backpropagates the error, and the updates the network parameters according to the learning algorithm used (e.g., gradient descent). Typically, there are no constraints on the updated network parameters. However, in the present example, at step 306, the application 236 constrains the network parameters and/or feature maps based on the architecture constraints of the inference platform.

In an example, the application 236 constrains the network parameters and/or feature maps during the training algorithm (e.g., after each iteration of backpropagation). In another example, the application 236 constrains the network parameters and/or feature maps after completion of the training algorithm (e.g., as a final step in the training algorithm). In such an example, the application 236 re-trains (e.g., performs another iteration) the neural network on the training platform using constrained network parameters and/or constrained feature maps to generate new network parameters. The application 236 can repeat this process for a plurality of iterations.

In an example, the application 236 constrains the network parameters and/or feature maps using a maximum number of the architecture constraints that achieves a desired accuracy for the neural network. For example, the application 236 can perform a first training pass using one or more architecture constraints to constraint the network parameters and/or feature maps. The application 236 can determine the resulting accuracy of the trained network. If the user desires increased accuracy, the application 236 can perform a second training pass using the previous architecture constraint(s) and one or more additional architecture constraints. This process can be repeated until a desired accuracy is achieved.

The architecture constraints express the architectural properties of the inference platform that can be exploited to assure an optimal mapping of the neural network onto the inference platform. Such architectural properties include specific compute capabilities, preferred bit-widths of the data and/or network parameters, and the like. Example architecture constraints are discussed below.

Figure 4:
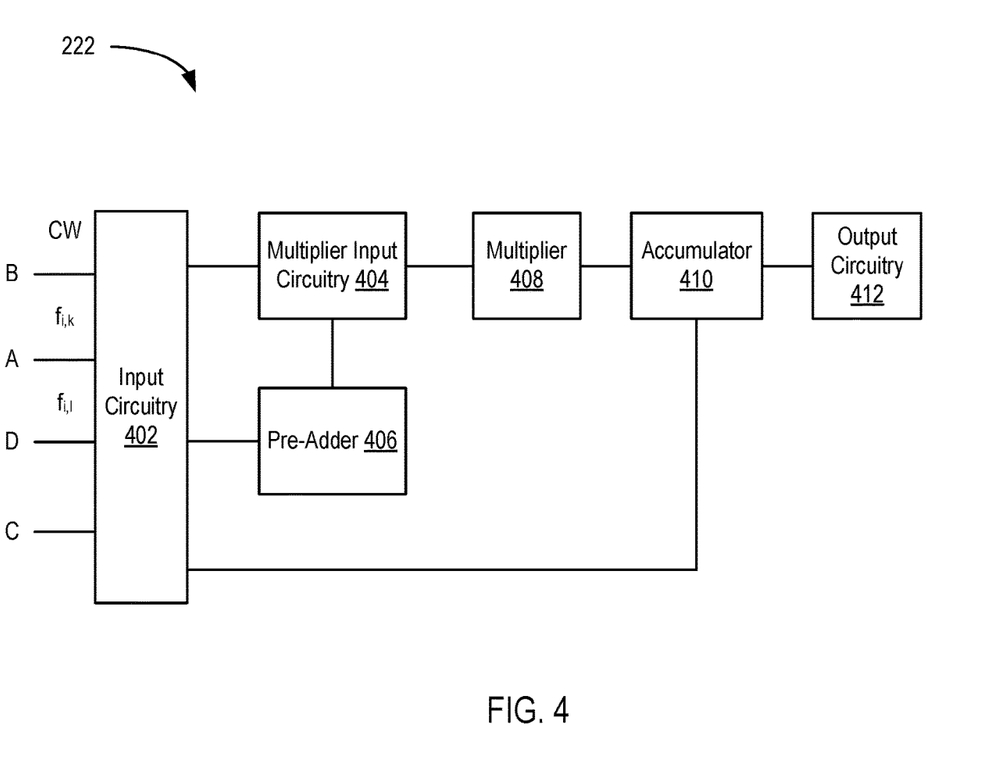
FIG. 4 is a block diagram depicting an example computation engine.

FIG. 4 is a block diagram depicting an example computation engine 222. The computation engine 222 includes input circuitry 402, multiplier input circuitry 404, a pre-adder 406, a multiplier 408, an accumulator 410, and output circuitry 412. The input circuitry 402 includes four inputs A, B, C, and D. The input circuitry 402 includes registers for buffering the inputs A . . . D and multiplexers for directing the inputs among the multiplier input circuitry 404 and the pre-adder 406. The multiplier input circuitry 404 includes registers for buffering the output of the input circuitry 402 and the output of the pre-adder 406. The accumulator 410 accumulates the output of the multiplier 408. The output circuitry 412 buffers the output of the accumulator 410. Assume, in this example, that the input circuitry 402 and the multiplier input circuitry 404 are configured such that the computation engine 222 can perform (A+D)*B.

In an example, an architecture constraint to exploit compute capabilities of the computation engine 222 shown in FIG. 4 can be used in the training process described above. That is, the architecture constraint used during training can include one or more constraints based on compute functionality of the inference platform circuitry. In an example, the compute functionality includes a structure of multiply-accumulate circuitry of the inference platform (e.g., arithmetic logic unit (ALU) capabilities), as well as data width constraints resulting from register bit-widths, bus/direct memory access (DMA) bit-widths, memory bit-widths, and the like. Notably, many operations in the different types of layers of a neural network involve a weighted sum of feature map values:

$$fo = \sum_{k} fi,k \times wk$$

where $f_{i,k}$ is an feature map value and $w_k$ is a weight value. As shown in FIG. 4, the computation engine 222 can include a pre-adder 406 that can add two values (e.g., inputs A and D) before applying multiplication (e.g., with input B). The pre-adder 406 can only be exploited if the weights applied to two feature map values are either the same or are inversed of each other. That is, for $f_{i,k}$ and $f_{i,l}$, then $w_k = w_l$ or $w_k = -w_l$.

In the example computation engine 222 of FIG. 4, the constrained weight (CW) is provided to the input B. The feature map value $f_{i,k}$ is provided to the input A. The feature map value $f_{i,l}$ is provided to the input D. Since the pre-adder 406 can perform either addition or subtraction, the mathematical relation between $w_l$ and $w_k$ is identify or negative. This mathematical relation between $w_k$ and $w_l$ becomes an architecture constraint that can be enforced during training. The resulting set of weights will have the property that some can be pairwise pre-added to reduce the number of required computation engines 222. For example, $w_k \times f_{i,k} + w_l \times f_{i,l}$ would require 2 multiplication operations, but if $w_k = w_l$, the operation becomes $w_k \times (f_{i,k} + f_{i,l})$ (i.e., only one pre-add and one multiplication operation).

In the example of FIG. 4, the inputs A . . . D are described as single digital values. In another example, a similar computation engine functions as a vector processor, where the inputs are vectors of values and the computation elements process the vectors. Such a vector computation element can be structurally similar to the computation engine 222 shown in FIG. 4.

In another example, an architecture constraint to exploit compute precision can be used. Assume the output bitwidth of the accumulator 410 is 48 bits. Assume further that a neural network includes a 3×3×384 convolutional kernel. As a result, 12 bits need to be reserved for the accumulation, leaving 36 bits for the result of the multiplication. Suppose the result of the multiplication (i.e., output of the multiplier 408) is constrained to be 32 bits. Then imposing 16-bit constraints on the weights and feature map values during ensures that the complete 3×3×384 convolution kernel can be executed on a single computation engine 222. Note that the constraints on the feature map values and weights are relative to one another. Thus, imposing a 14-bit constraint on the weights and an 18-bit constraint on the feature map values (or vice versa) achieves the same result. In other examples, other bitwidth values can be used to constrain the feature map values with respect to the weights.

Figure 5:
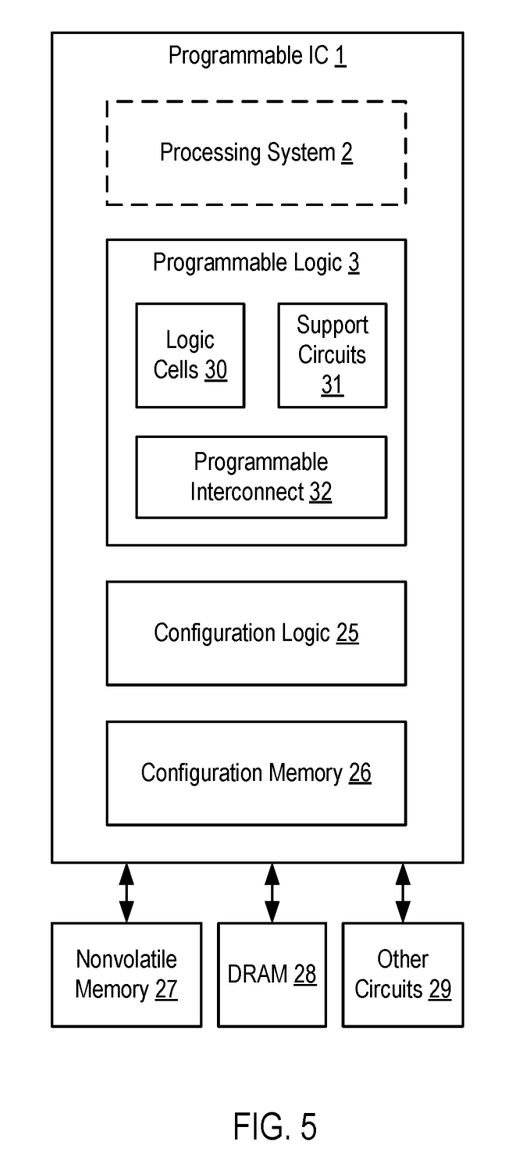
FIG. 5 is a block diagram depicting a programmable integrated circuit (IC) according to an example.

FIG. 5 is a block diagram depicting a programmable IC 1 according to an example. The programmable IC 1 can be used as the IC 220 in FIG. 2. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 6:
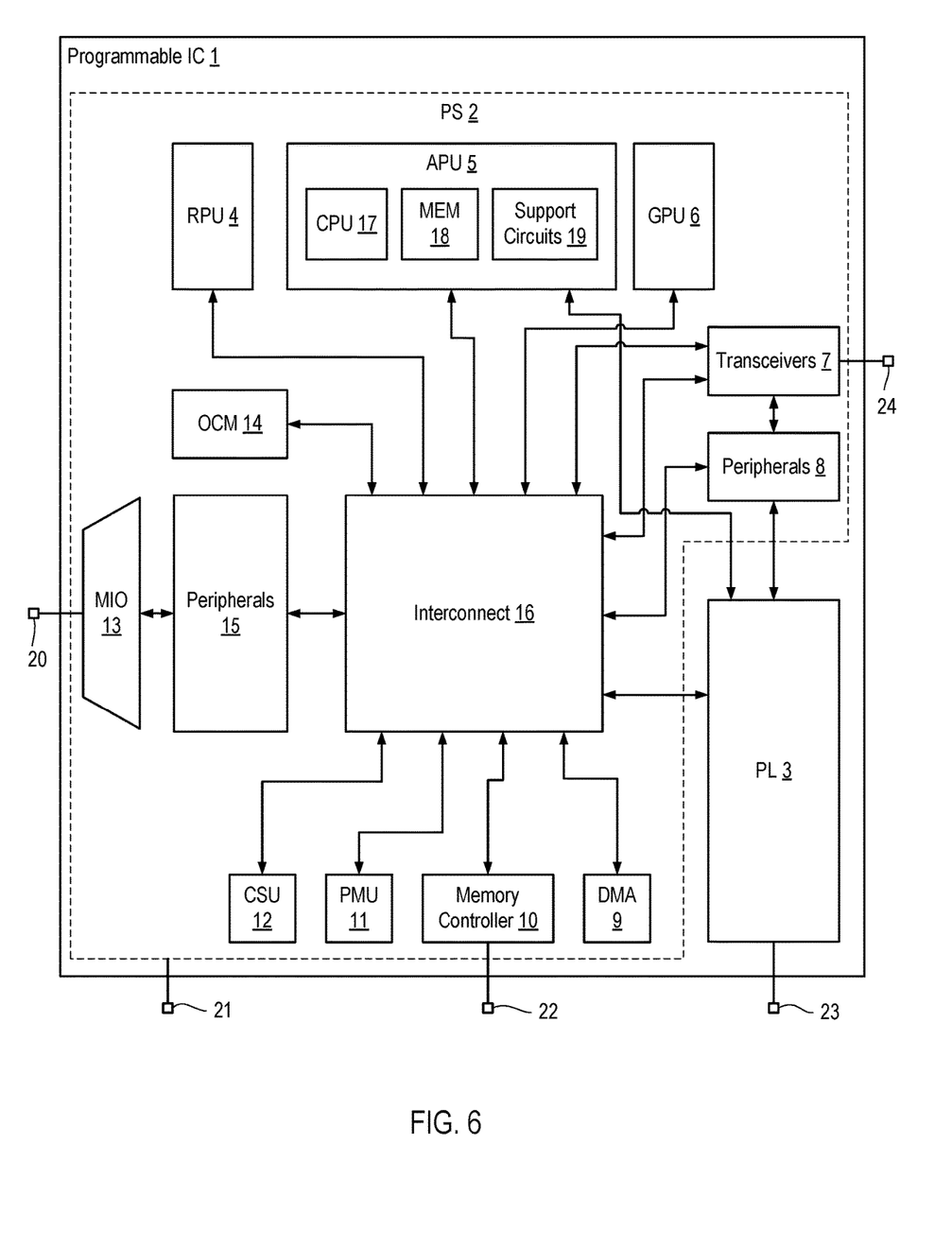
FIG. 6 is a block diagram depicting a System-on-Chip (SoC) implementation of the programmable IC of FIG. 5.

FIG. 6 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed 10 (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 132 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose 10 (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 7:
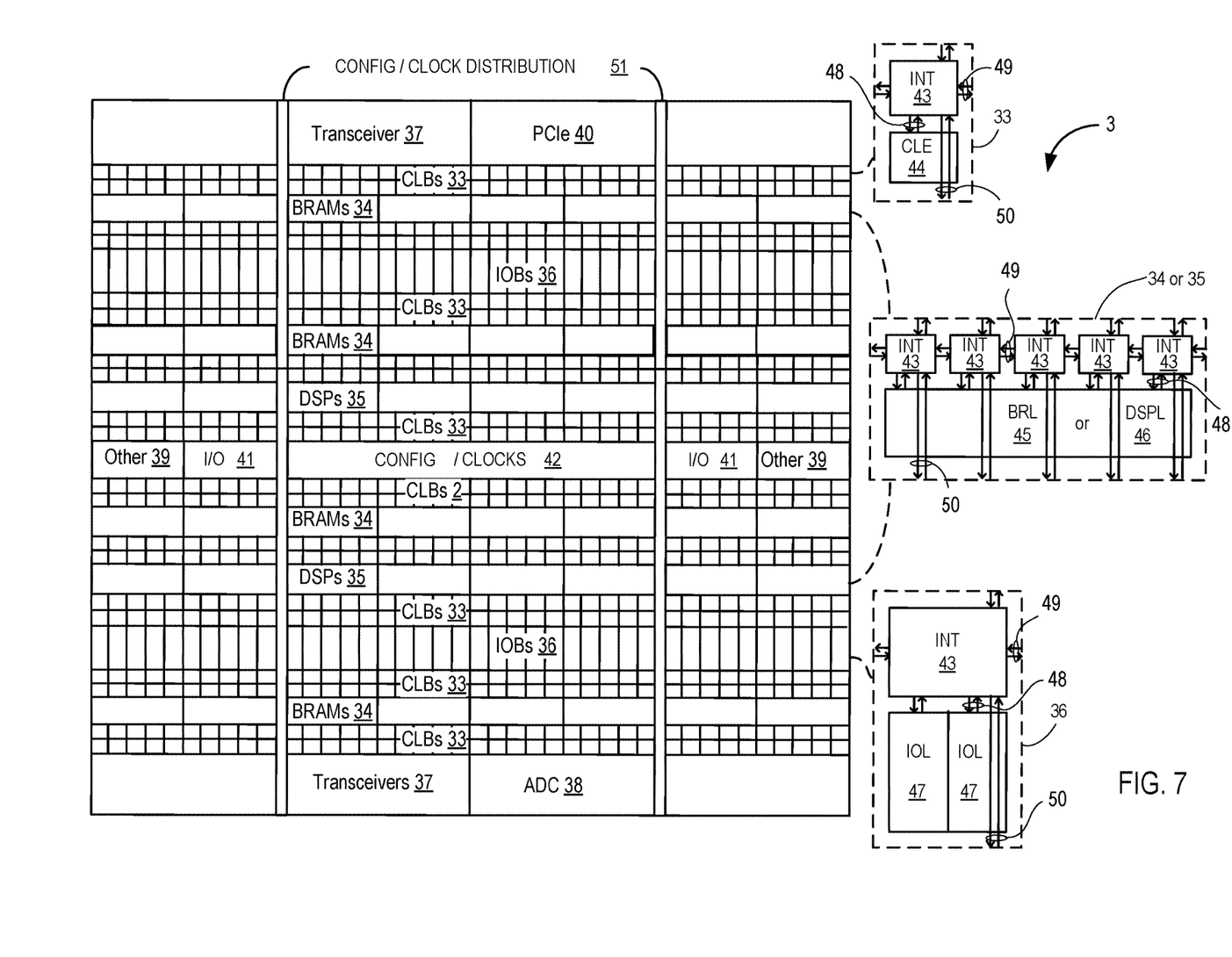
FIG. 7 illustrates a field programmable gate array (FPGA) implementation of the programmable IC of FIG. 5.

FIG. 7 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 7. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An IOB 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 7) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 7 include additional logic blocks that disrupt the regular columnar structure making up a large part of the FPGA. The additional logic blocks can be programmable blocks and/or dedicated logic.

Note that FIG. 7 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 7 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

Techniques for architecture optimized training of neural networks have been described. In an example, a method optimizing a neural network having a plurality of layers includes obtaining an architecture constraint for circuitry of an inference platform that implements the neural network, training the neural network on a training platform to generate network parameters and feature maps for the plurality of layers, constraining the network parameters, the feature maps, or both the network parameters and the feature maps, based on the architecture constraint. In an example, the architecture constraint includes a plurality of constraints at least one of which is used as a constraint during training. In an example, training is performed using a maximum number of the plurality of architecture constraints that achieves a desired accuracy for the neural network. In an example, network parameters and/or feature maps are constrained during training of the neural network. In an example, network parameters and/or feature maps are constrained after training the neural network. In such an example, the neural network can be re-trained using the constrained network parameters and/or constrained feature maps. In an example, the architecture constraint includes one or more constraints based on compute functionality of the circuitry of the inference platform. In an example, the compute functionality includes a structure of multiply-accumulate circuitry of the inference platform (e.g., arithmetic logic unit (ALU) capabilities), as well as data width constraints resulting from register bit-widths, bus/direct memory access (DMA) bit-widths, memory bit-widths, and the like.

The techniques described herein address the high compute/memory demands on inference platforms for neural networks by optimizing the neural networks during the training phase. The network parameters and/or feature maps are optimized based on inference platform architecture to assure an ideal match with the inference platform during the inference phase. Conventional neural network training techniques do not take architecture aspects of the inference platform into account during training. By employing the techniques described herein, the function of the inference platform for implement a neural network is improved.

The various examples described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more examples techniques described herein may be useful machine operations. In addition, one or more example techniques also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various examples described herein may be practiced with other computing system configurations including hand-held devices, microprocessor systems, microprocessor-based or programmable consumer electronics, minicomputers, mainframe computers, and the like.

One or more example techniques described herein may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

While the foregoing is directed to specific examples, other and further examples may be devised without departing from the basic scope thereof, and the scope thereof is determined by the claims that follow.

What is claimed is:

1. A method of optimizing a neural network having a plurality of layers, the method comprising:
    obtaining architecture constraints for circuitry of an inference platform that implements the neural network, wherein the architecture constraints comprise a first architecture constraint based on structure of the circuitry of the inference platform and a related data parameter constraint;
    training the neural network on a training platform using the architecture constraints to generate network parameters and feature maps for the plurality of layers; and
    constraining, during the training of the neural network, the network parameters, the feature maps, or both the network parameters and the feature maps, based on the architecture constraints.

2. The method of claim 1, wherein the step of constraining is performed using a maximum number of the architecture constraints that achieves a desired accuracy for the neural network.

3. The method of claim 1, further comprising:
    re-training the neural network on the training platform using constrained network parameters, constrained feature maps, or both constrained network parameters and constrained feature maps to generate new network parameters.

4. The method of claim 1, wherein the first architecture constraint includes one or more constraints based on compute functionality of the circuitry of the inference platform.

5. The method of claim 4, wherein the compute functionality includes a structure of multiply-accumulate circuitry of the inference platform and data width constraints.

6. The method of claim 1, wherein the architecture constraints further comprise a second architecture constraint based on the structure of the circuitry of the inference platform, and wherein the method further comprises:
    re-training the neural network using the first architecture constraint, the data parameter constraint, and the second architecture constraint to generate updated network parameters and updated feature maps; and
    constraining, during re-training the neural network, the constrained network parameters, the constrained feature maps, or both the constrained network parameters and the constrained feature maps, based on the second architecture constraint.

7. The method of claim 1, wherein the first architecture constraint includes a first weight and a second weight, and wherein a magnitude of the first weight is equal to a magnitude of the second weight.

8. A computing system, comprising:
    a hardware platform for training a neural network, the hardware platform including at least one processor, a memory, and a training platform;
    a software platform, executing on the hardware platform, the software platform including program code, stored in the memory, executable by the at least one processor to perform functions of:
        obtaining architecture constraints for circuitry of an inference platform that implements the neural network, wherein the architecture constraints comprise a first architecture constraint based on structure of the circuitry of the inference platform and a related data parameter constraint;
        training the neural network on the training platform using the architecture constraints to generate network parameters and feature maps for plurality of layers of the neural network; and
        constraining, during the training of the neural network, the network parameters, the feature maps, or both the network parameters and the feature maps based on the architecture constraints.

9. The computing system of claim 8, wherein the program code is executable to perform the function of constraining using a maximum number of the architecture constraints that achieves a desired accuracy for the neural network.

10. The computing system of claim 8, wherein the program code is executable to perform a function of:
    re-training the neural network on the training platform using constrained network parameters, constrained feature maps, or both constrained network parameters and constrained feature maps to generate new network parameters.

11. The computing system of claim 8, wherein the first architecture constraint includes one or more constraints based on compute functionality of the circuitry of the inference platform.

12. The computing system of claim 11, wherein the compute functionality includes a structure of multiply-accumulate circuitry of the inference platform and data width constraints.

13. The computer system of claim 8, wherein the architecture constraints further comprise a second architecture constraint based on the structure of the circuitry of the inference platform, and wherein the at least one processor further performs the function of:
 re-training the neural network using the first architecture constraint, the data parameter constraint, and the second architecture constraint to generate updated network parameters and updated feature maps; and
 constraining, during re-training the neural network, the constrained network parameters, the constrained feature maps, or both the constrained network parameters and the constrained feature maps, based on the second architecture constraint.

14. The computer system of claim 8, wherein the first architecture constraint includes a first weight and a second weight, and wherein a magnitude of the first weight is equal to a magnitude of the second weight.

15. A non-transitory computer readable medium having instructions stored thereon that when executed by a processor cause the processor to perform a method of optimizing a neural network having a plurality of layers, the method comprising:
 obtaining architecture constraints for circuitry of an inference platform that implements the neural network, wherein the architecture constraints comprise a first architecture constraint based on structure of the circuitry of the inference platform and a related data parameter constraint;
 training the neural network on a training platform using the architecture constraints to generate network parameters and feature maps for the plurality of layers; and
 constraining, during the training of the neural network, the network parameters, the feature maps, or both the network parameters and the feature maps based on the architecture constraints.

16. The non-transitory computer readable medium of claim 15, wherein the first architecture constraint includes one or more constraints based on compute functionality of the circuitry of the inference platform.

17. The non-transitory computer readable medium of claim 16, wherein the compute functionality includes a structure of multiply-accumulate circuitry of the inference platform and data width constraints.

* * * * *